Figure 1:
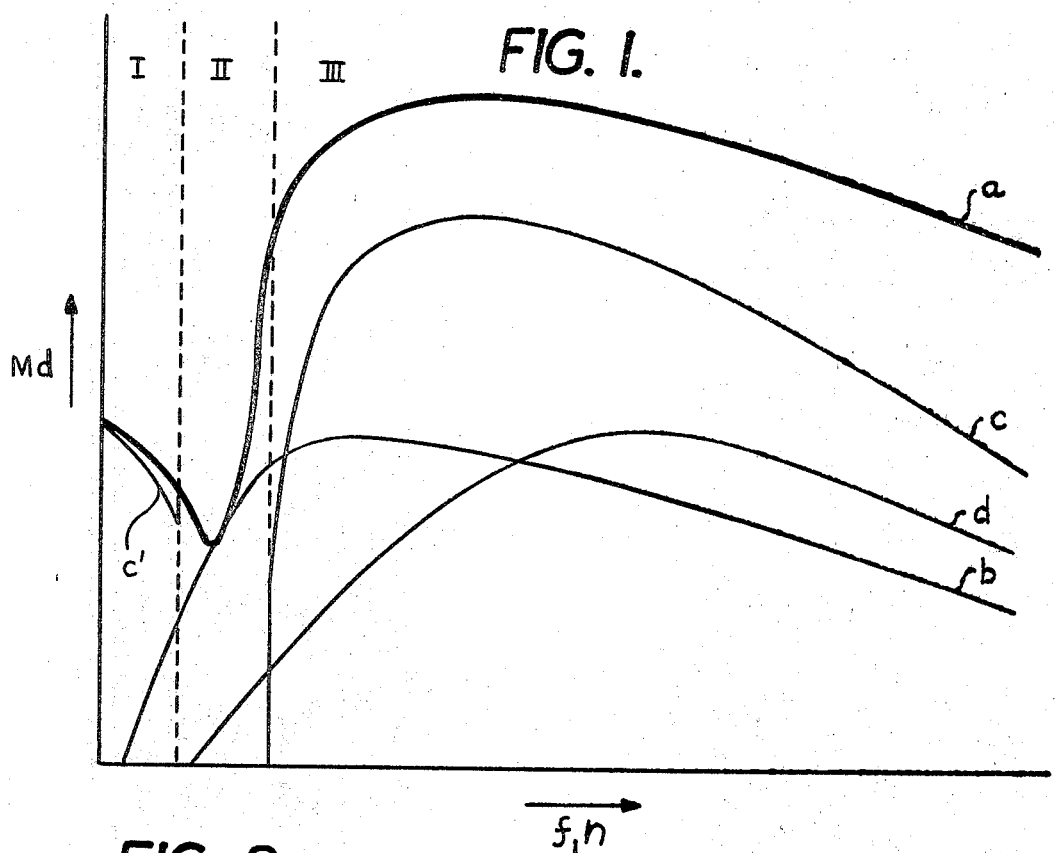

United States Patent

[11] 3,553,512

| | | |
|---|---|---|
| [72] | Inventors | Wolfgang Vettermann;<br>Roland Sudler, Frankfurt am Main,<br>Germany |
| [21] | Appl. No. | 827,728 |
| [22] | Filed | May 26, 1969 |
| [45] | Patented | Jan. 5, 1971 |
| [73] | Assignee | Udo Tachometer Werke Adolf Schindling<br>G.m.b.H.<br>Frankfurt am Main, Germany<br>a corporation of Germany |
| [32] | Priority | May 31, 1968 |
| [33] | | Austria |
| [31] | | No. A5244/68 |

[54] SINGLE PHASE MOTOR
5 Claims, 3 Drawing Figs.

[52] U.S. Cl. .................................................. 310/174,
310/156, 310/163, 310/182
[51] Int. Cl. ........................................................ H02k 27/04
[50] Field of Search............................................. 310/162,
163, 166, 174, 156, 164, 172, 261, 264, 182

[56] References Cited
UNITED STATES PATENTS

| | | | | |
|---|---|---|---|---|
| 1,959,391 | 5/1934 | Spencer.................... | | 310/164 |
| 2,015,042 | 9/1935 | Reinhardt................... | | 310/172 |
| 2,266,878 | 12/1941 | Lux............................. | | 310/164 |
| 2,665,389 | 1/1954 | Landgraf..................... | | 310/164 |
| 3,181,019 | 4/1965 | Pfister........................ | | 310/156 |

*Primary Examiner*—Milton O. Hirshfield
*Assistant Examiner*—R. J. Skudy
*Attorney*—Ernest G. Montague ABSTRACT: A single-phase motor with variable speed proportional to the frequency of the supply voltage, which comprises a split pole-hysteresis motor including split stator poles. The split stator poles include each a main pole and a auxiliary pole set off for a predetermined angle in peripheral direction and carrying a short-circuiting winding. The motor includes a rotor comprising radially magnetized, disc-or ring-shaped permanent magnets, for creation of the main portion of the synchronous torque, and a disc-or ring-shaped element, serving the creation of an asynchronous moment of a magnetizable material with distinct hysteresis. The cross section of the short-circuiting winding, disposed on the auxiliary poles, is dimensioned such, that the maximum of the asynchronous moment is created in the lower portion of the frequency range of the supply voltage.

PATENTED JAN 5 1971

3,553,512

INVENTORS
WOLFGANG VETTERMANN
ROLAND SUDLER
BY
ATTORNEY.

SINGLE PHASE MOTOR

The present invention relates to a single-phase motor having a variable speed proportional to the frequency of the supply voltage, in general, and to a split pole-hysteresis motor, in particular, the split stator poles of which comprise each a main pole and an auxiliary pole carrying a short circuiting winding and which are set off for a predetermined angle in the peripheral direction, and the rotor of which comprises radially magnetized disc- or ring-shaped permanent magnets, serving the production of the main portion of the synchronous torque and a disc or ringlike element serving substantially the production of an asynchronous moment and composed of a magnetizable material with distinct hysteresis.

In technical fields of application, driving motors having a variable speed proportional to a control frequency are required, which for reason of expenses, should be driven as much as possible, single-phased, because three-phase generators are appreciably more expensive.

In the connection, as a possible application, there are during motors for electric speedometers for automotive vehicles, which are coupled with an odometer counter. The driving motor can thereby be fed by a frequency generator, which, for instance, may be driven from a wheel axle of the vehicle. Since the odometer must count from the start of the movement of the vehicle and, thereby, from the frequency zero on, and, on the other hand, the speedometer should accurately operate still at high speed and frequencies of 50 Hz and more, respectively, a driving motor is required, the speed of which must be variable in a wide range starting with zero and proportional to the speed of the vehicle. The motor should operate in the lowermost range from zero up in a step operation, in order to bring about an exact counting of the covered path. The speed measuring, however, with suppressed zero point as a rule, can start at a speed of about 5 km./hour, that means from a frequency of the supply voltage corresponding to this speed the motor should operate in synchronous operation up to the upper limit frequency.

It is one object of the present invention to provide a single phase motor with a variable speed proportional to the frequency of the supply voltage which is, as much as possible simple, as to its structure and, therefore, economical as to its manufacture and which is capable of driving, precisely at the start of the movement of the vehicle in a step operation, a convention odometer counter, which has a safe transformation from the step operation to the synchronous operation as well as which can produce the necessary torque for the drive of a speedometer up to the final speed, for instance, of an eddy current speedometer, and which should run automatically rapidly again in synchronous operation upon going out of step for any reason.

For this purpose, the synchronous motors known for regulation and control purposes in many embodiments, so-called synchros, rotary indicators or the like, are available. Such motors, however, for physical reasons can only be operated three-phased or multiphased and are, therefore, comparatively expensive. Also the necessary expenditure of circuitry and susceptibility to breakdown are too great.

For the desired one-phase operation, furthermore, split pole hysteresis motors are known, which have, as a rule, a two-pole stator, the poles of which are split into a main pole and an auxiliary pole carrying a short circuiting winding and set off for a predetermined angle in peripheral direction. The rotor comprises magnetizable material with a distinct hysteresis. These known split pole motors are, however, as to their output too weak and already fall out of step at a low load. First of all, however, they have the drawback, that during a step operation no defined rotor rest position and thus no uniform switching angle is assured. For the output improvement and increase of the synchronous torque of such split pole hysteresis motors, an embodiment is known, in which on the rotor of hysteresis material one or a plurality of radially magnetized disc or ringlike permanent magnets are rigidly secured. By the permanent magnets, the synchronous moment is appreciably increased. Since, however, simultaneously, by the stray flux of the permanent magnets, which can impress fixed poles on the hysteresis part of the motor and due to the glue moment caused by the permanent magnets, the asynchronous moment originating from the hysteresis portion of the rotor is weakened, and this motor likewise already falls out of step in the transfer range from the step operation into the synchronous operation at low loads. These one phase split-pole motors, which are simple in their structure, are, therefore, also well suitable only for the synchronous operation at certain speeds.

It is another object of the present invention to provide a single-phase motor having a variable speed proportional to the frequency of the supply voltage, wherein the drawback for the step operation is cured in such manner, that the cross section of the short circuiting winding disposed on the auxiliary poles is dimensioned such that the maximum of the asynchronous moment is disposed in the lower portion of the frequency range of the supply voltage of the motor, preferably between 5 and 20 Hz. By a possibly largest dimension of the cross section of the short circuit winding on the auxiliary poles up to the limit given by the spacial conditions and the permissible heating in connection with the selection of the hysteresis material with possibly high remanence and low coercive intensity, which is disposed between the permanent magnets and magnetic soft materials, the maximum of the course of the asynchronous moment obtainable during a predetermined excitement of the main poles by the stator winding dependency upon the frequency of the supply voltage, is displaced so far towards the lower frequency range, that in the relatively flat expressed maximum of the asynchronous moment course in the critical frequency range of the motor, namely the transfer from the step operation into the synchronous operation, still such high synchronous starting torque is effective, that a safe transfer is assured also during the provided load, for instance by a conventional odometer counter having a high friction resistance. By the dimension of the cross section of the short circuit windings on the auxiliary poles, the weakening of the asynchronous moment originating from the glue moment and stray flux of the permanent magnets can be compensated. As a further advantage, an increased damping of the oscillations of the rotor by the amplification of the asynchronous moment in the lowermost frequency range and, thereby, a safe rest position results after each switching step.

Since the displacement of the maximum of the asynchronous torque towards the lowermost frequency range causes, however, that in the upper frequency range caused by the falling curve course, the portion originating from the hysteresis part of the rotor is weakened at the synchronous torque of the motor, this can bring about, that the loaded motor, when for example, the supply voltage at high-speeds is briefly interrupted or collapses, does not have any more a sufficiently high synchronous starting torque, in order to run again or start again in the synchronous operation. In order to avoid this drawback, the present invention provides as a further measure on the rotor at least two permanent magnets arranged separate in axial direction, the magnetizing axles of which are set off in peripheral direction for the same or approximately the same angle for which each a main and an auxiliary pole of the stator are set off relative to each other in peripheral direction. By this set off of the magnet axes of the permanent magnet a magnetic field distribution of the rotor in the peripheral direction results such, that the glue moment exerted by the permanent magnets is appreciably reduced and also their stray flux effect is lowered. This reduction of the weakening effect of the permanent magnet results, in the upper frequency range at high motor speeds, the desired portion improvement on the synchronous torque from the hysteresis part of the rotor, and also a finally necessary; sufficient synchronous starting torque.

A dimensioning of the cross section of the short circuiting winding on the auxiliary poles causing the displacement of the maximum of the asynchronous torque is, in accordance with the present invention, of advantage then, when this cross section is larger than the cross section of the iron core of the auxiliary poles. The starting and switching direction of the motor can be additionally secured by a design of the stator-pole shoes causing a preferred direction of rotation and in particular in known manner by the one-sided extension of the direction of rotation. For a compact motor structure, it is furthermore of advantage to form the stator winding as a ring coil.

Figure 2:
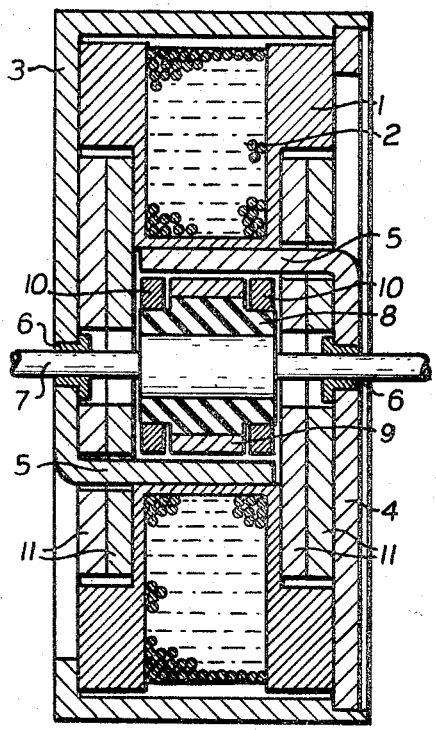
Figure 3:
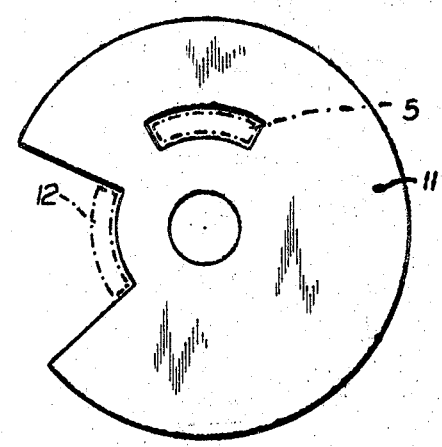

With these and other objects in view, which will become apparent in the following detailed description, the present invention which is shown by example only, will be clearly understood in connection with the accompanying drawings, in which:

FIG. 1 is a moment diagram;
FIG. 2 is an axial section of the motor; and
FIG. 3 is an elevation of a short circuiting winding.

Referring now to the drawings, and in particular to FIG. 1 the course of the moments or torque is disclosed in the three ranges distinguishing operational types of the motor in dependency upon the frequency generator producing the same by example in dependency upon the speed. In the range I, the motor performs a step operation. The range II characterizes the critical frequency range, in which the transfer from the step operation into the range of the synchronous operation, identified by III, takes place. While the characteristic line $a$ shows the course of the total moment of the motor, the line $b$ shows the course of the asynchronous moment, originating from the hysteresis portion of the rotor, and the line $c$ the course of the synchronous moment originating from the permanent magnets or the rotor. The characteristic line $d$ shows, for the purpose of comparison, the run of the asynchronous moment of a split pole-hysteresis motor, without the measures in accordance with the present invention, and without permanent magnets on the rotor. It is recognizable that such motor is not suitable for the step operation.

For the start of the motor in the step operation (range I), at first exclusively the synchronous moment $c'$ of the permanent magnet portion is effective. At a frequency of the supply voltage of about 2—3 Hz, this moment practically collapses; it oscillates in the critical range II undefined between positive and negative values; and it appears at the end of the range II as a synchronous moment with a course according to the characteristic line $c$ for the permanent run of the motor. The gap in the critical frequency range II, the junction from the step operation to the synchronous operation, is filled, in accordance with the present invention, by the displacement of the asynchronous characteristic line $b$ towards the lowermost frequency range. The asynchronous torque originating from the hysteresis portion of the motor and already effective in this range, is sufficiently great, in order to prevent the falling out of step of the motor at the end of the step range I, to bridge over the transfer range II in the asynchronous running and to assure a fast transfer into the synchronous operation (range 111).

FIG. 2 shows the structure of a motor in an axial section through the auxiliary poles designed in accordance with the present invention. The motor comprises a reel body 1 with a ring coil winding 2 which is completely surrounded by a pole sheet cap and a cover part 4. The stator poles are stamped from the bottom of the cap 3 and the cover 4 and bend over towards the inner cylindrical face of the stator. Only the auxiliary poles 5 are visible of the poles in the section shown in the drawing. The rotor with its shaft 7 is mounted in bearing bushings 6 at the bottom of the cap 3 and cover 4. The shaft 7 carries an electrically nonconducting core portion 8, on which in the center a ring of hysteresis material 9 and at both sides permanent magnet rings 10 are arranged rigidly sitting thereon.

A short circuiting winding in the form of two copper discs 11 each slides on the auxiliary poles 5. FIG. 3 shows an elevation of these short circuiting discs and one recognizes, that the effective cross section of the entire short circuiting winding is greater in the shown example, than the iron core cross section of the auxiliary poles 5. In FIG. 3, an auxiliary pole 5 is shown in dotted lines and the complementary main pole 12, otherwise not shown, which is arranged in a sector cut of the short circuiting disc 11. The magnetizing axes of both permanent magnet rings are set off relative to each other at about the same angle about which a main pole and an auxiliary pole of the stator are set off in the peripheral direction. The shape of the discs 11 serves the creation of shunt-paths for the short circuit currents and a better dissipation of the heat created in the discs.

While we have disclosed one embodiment of the present invention, it is to be understood that this embodiment is given by example only and not in a limiting sense.

We claim:

1. A single-phase motor with variable speed proportional to the frequency of a supply voltage, comprising a split pole-hysteresis motor including split stator poles, said split stator poles including each a main pole and an auxiliary pole set off at a predetermined angle in a peripheral direction and carrying a short circuiting winding, said motor includes a rotor comprising radially magnetized, narrow permanent magnets with a cylindrical periphery, for creation of the main portion of the synchronous torque, and a cylindrical element serving the creation of an asynchronous moment, made of a magnetizable material with distinct hysteresis, the cross section of said short circuiting winding disposed on said auxiliary poles being dimensioned such, that the maximum of said asynchronous moment is created in lower portion of the frequency range of the supply voltage, approximately between 5 and 20 Hz.

2. The single-phase motor, as set forth in claim 1, wherein said cross section of said short circuiting winding is greater than the cross section of the iron core of said auxiliary poles.

3. The single-phase motor, as set forth in claim 1, wherein said rotor includes at least two of said permanent magnets disposed separately in axial direction, the magnetization axes of said permanent magnets are set off in peripheral direction for substantially the same angle, for which each of said main poles and each of said auxiliary poles of said stator are set off in peripheral direction.

4. The single-phase motor, as set forth in claim 1, which includes stator pole shoes of a design causing a predetermined direction of rotation.

5. The single-phase motor, as set forth in claim 1, wherein the winding of said stator comprises a ring coil.